(12) United States Patent
Fujita

(10) Patent No.: US 6,270,699 B1
(45) Date of Patent: Aug. 7, 2001

(54) PRODUCTION METHOD FOR MOLDING OPTICAL COMPONENTS

(75) Inventor: Hiroaki Fujita, Hatogaya (JP)

(73) Assignee: Fuji Photo Optical Co., Ltd., Omiya (JP)

( * ) Notice: Subject to any disclaimer, the term of this patent is extended or adjusted under 35 U.S.C. 154(b) by 0 days.

(21) Appl. No.: 09/534,052

(22) Filed: Mar. 24, 2000

(30) Foreign Application Priority Data

Mar. 29, 1999 (JP) .................................................. 11-085476

(51) Int. Cl.⁷ ...................................................... B29D 11/00
(52) U.S. Cl. .............................................. 264/2.7; 264/2.4
(58) Field of Search ............................. 264/1.1, 2.2, 2.4, 264/2.7; 425/808

(56) References Cited

U.S. PATENT DOCUMENTS

| | | |
|---|---|---|
| 1,484,085 | 2/1924 | Rule . |
| 1,558,790 | 10/1925 | Chalmers . |
| 1,873,021 | 8/1932 | Peiler . |
| 1,888,963 | 11/1932 | Peiler . |
| 2,302,918 * | 11/1942 | Smith ...................................... 264/2.7 |
| 2,532,501 | 12/1950 | Johnson . |
| 2,993,302 | 7/1961 | Soubier . |
| 3,396,214 | 8/1968 | Crandon . |
| 5,171,347 * | 12/1992 | Monji et al. ........................... 264/2.7 |
| 5,662,951 | 9/1997 | Greshes . |
| 5,718,850 * | 2/1998 | Takano et al. ......................... 264/2.7 |
| 5,945,045 | 8/1999 | Parker . |
| 6,015,512 * | 1/2000 | Yang et al. ............................ 264/2.2 |

* cited by examiner

Primary Examiner—Mathieu D. Vargot
(74) Attorney, Agent, or Firm—Arnold International; Bruce Y. Arnold

(57) ABSTRACT

An optical component is manufactured by precisely measuring the final volume of the optical component, precisely measuring an amount of optical material that will yield that final volume, and discharging it through a nozzle to form a spherically-shaped optical agglomerate, pressing the spherically-shaped optical agglomerate into a disc-shaped optical preform, and then using the disc-shaped optical preform to mold an optical component of a precise final volume. The disc-shaped preform fits stably on a convex upper surface of a lower mold, and the molding operation progresses uniformly and smoothly, thereby yielding a final form optical component.

10 Claims, 2 Drawing Sheets

PRODUCTION METHOD FOR MOLDING OPTICAL COMPONENTS

BACKGROUND OF THE INVENTION

Traditionally an optical component, such as an optical glass lens element, has been produced from optical materials, such as crown or flint glass. The final finishing procedure has been performed by grinding and polishing in order to obtain desired lens element surfaces.

Various parameters that must be taken into consideration when forming lens elements from molten and heat-plasticized optical materials are well known, with U.S. Pat. No. 1,558,790 to Chalmers, U.S. Pat. No. 1,888,963 to Peiler, and U.S. Pat. No. 2,993,302 to Soubier, being examples. Chalmers discloses the need for weight control and the comparatively fine limits that must be maintained for slow flowing, rapid chilling optical materials. Peiler discloses the need for regulating the optical material mass, time, size and working conditions. Soubier discusses the need to control temperature, pressure, orifice dimensions, etc., in order to obtain the proper amount of molten material when forming a mold charge.

In some conventional molding methods optical materials are inserted into molds before being pressed between an upper mold and a lower mold having a shell barrel for confining the optical material between the upper and lower molds and for guiding the molds during the molding procedure. In press molding, where at least the lower mold has a convex surface, one routine procedure is to insert the optical material into molds by dropping it from a nozzle. There are advantages to using this drop method that forms a spherically-shaped agglomerate. The two most notable are the volume accuracy requirement of the produced lens element and the overall production cost. However, because the optical materials are almost spherical, they tend to be off balance and slip and shift to one side of the mold space when placed on the convex shaped lower mold surface. The optical materials will usually not stay at the center of the mold but will roll off of the raised central convex area and lodge against the mold barrel. When the optical materials slip and shift inside the mold space before pressing, irregularities often result. Thus, the lens element that is formed is often eccentric. A part of the optical material sometimes flows into the space between the lower mold and the mold barrel, causing difficulty in retracting the mold and optical component. It is also common to have stress or pressure irregularities form within the resulting optical component. On occasion it is even possible to damage the mold.

Measuring and charging molds with hot melt optical materials has been common for many years. U.S. Pat. No. 1,484,085 to Rule discloses using various size outlets for control of the size and shape of a charge used for molds. U.S. Pat. No. 1,873,021 to Peiler discloses control of the form and size of the hot preform charge to approximate the interior of the mold walls as closely as possible. The defects caused by surface chill and the resulting stretching and rupture of the chilled surface during pressing are also disclosed. U.S. Pat. No. 5,945,045 to Parker attempts to inject a precise, known shot volume of molten material into a mold.

In another method, the optical materials inserted into the molds are cut from plate glass. These are usually disc shaped preforms that have fixed planes that are relatively stable in the molds and stay at or close to the center of the mold. However, as the optical materials are cut from plate glass, it is difficult to provide each one with the same volume, and even more difficult to provide them with the same volume that the final optical component will have. Because of this, it is necessary that the lens elements be treated after molding with extremely accurate cutting and/or grinding, and followed by polishing if precision lens elements are to be prepared. When using flat, disc-shaped optical materials, the slip and shift within the mold space does not occur but the optical component shape was either incomplete or not obtained. In order to adjust the curvature and volume of the optical material so as to be identical to the desired lens element volume, an accurate grinding process was required. This resulted in the production process being more costly.

Many optical manufacturers use optical material preforms to make a final optical component. U.S. Pat. No. 2,532,501 to Johnson places a cold preform between dies and heats and presses to form an optical component. U.S. Pat. No. 3,396,214 to Crandon places a blank or optical preform in a mold that is almost in the final shape desired, and then forms a final coating on the blank or uses ultrasonic means to modify the blank. U.S. Pat. No. 5,662,951 to Greshes uses a molten preform mass and prefers to have excess material for later manipulation control. Because of the concave lower surface giving a point or line contact with the mold surfaces, air trapping is prevented.

Recently lens elements with comparatively small diameters have been produced by press molding. This method places the optical material into the molding unit and forms the lens element by compressing the optical material between the surfaces of the mold.

BRIEF SUMMARY OF THE INVENTION

The present invention relates to a process for molding optical components, such as lens elements, including formation of precise volume, disc-shaped preforms used to compression mold the same final volume optical components. The first step in the process is to determine precisely the volume of the final optical component or lens element. A preform for the final lens element is then manufactured or formed by precisely measuring out the amount of optical material or agglomerate that will yield the same volume as the final optical component or lens element. The measured amount of optical material is then pressed into a shape that will fit securely and stably within a mold over a convexly shaped lower mold surface. This can be a plate or disc shape taking into account the mold and final lens element diameter. The preform is then placed within the molding unit, heated if necessary, and pressed into its final optical component form. Because of the steps and precautions taken in the manufacture of the preform, the preform is held in a stable state within the mold, molding pressures are distributed uniformly across the lens element, volume accuracy is precise and production costs are moderate. The lens element formed is precisely in the shape of the mold and can be used without further treatment, such as the routinely performed grinding or cutting and polishing.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The present invention attains the benefits of prior art processes while overcoming their disadvantages.

Figure 1:
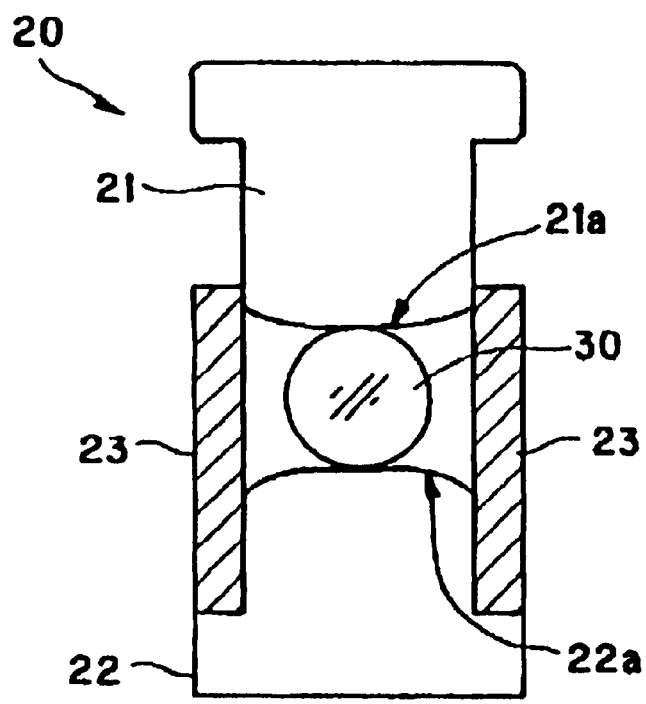
FIG. 1 depicts a conventional prior art vertical pressure molding unit with a spherically-shaped optical material shown centered between the upper and lower mold members.
Figure 2:
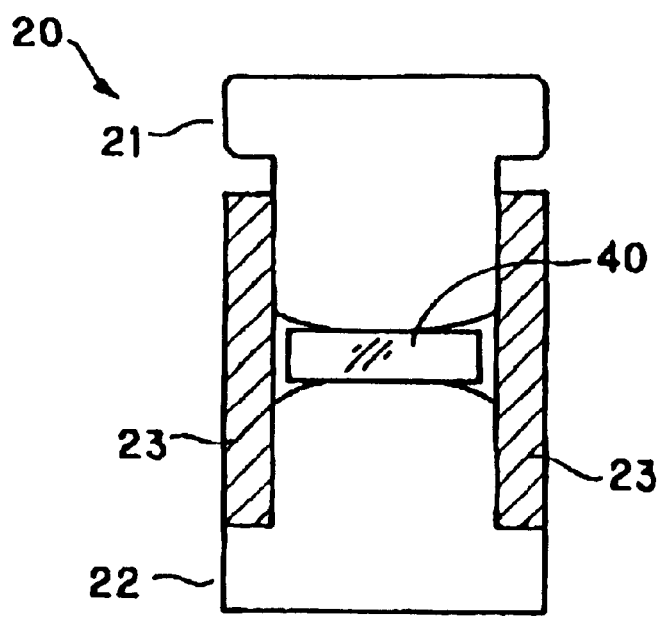
FIG. 2 depicts a conventional prior art vertical pressure molding unit with a cut, disc-shaped optical material preform shown between the upper and lower mold members.

FIGS. 1 and 2 represent a prior art molding unit using two common procedures for forming optical lens elements. In the figures, the mold unit 20 includes an upper mold 21, a lower mold 22 with a shell or barrel 23 surrounding and confining the molding area and guiding the upper and lower mold sections as the mold presses the optical material placed between them. At least the lower mold 22 has a convex upper surface 22a and the upper mold 21 is also shown with a convex lower surface 21a.

With this apparatus design, an air pressure mechanism (not shown) can drive the upper mold 21 up and down. When the upper mold 21 moves toward the lower mold 22, the mold barrel 23 functions to keep the upper and lower molds perfectly aligned and confines the optical material between the upper and lower molds. A heating unit (not shown) is placed around the circumference of the molding unit 20. When pressure molding, the optical material 30 or 40 is placed onto the mold surface 22a of the lower mold 22; then, the heating unit (not shown) heats up the optical material. Heating is continued until the temperature of the glass or optical material employed achieves the transition or plastic state. After the plastic state is reached, the air pressure mechanism associated with the upper mold 21 moves the upper mold down and applies pressure to the optical material 30 or 40. The optical material 30 or 40 is molded into the form of the shaped space between the lower mold surface 22a and the upper mold surface 21a. Subsequently, the optical component formed is gradually cooled, and the upper mold 21 is raised by the air pressure mechanism and the optical component is retracted from between the upper and lower molds.

The first commonly used procedure is to insert the optical material into the mold by dropping it from a nozzle. The dropped optical material routinely takes the general shape of a drop or sphere. The optical material 30 or agglomerate can be a cold, roughly spherical solid or a hot plastic mass. When dropping the heated material from a nozzle, where heated to a viscous condition, the advantages are that the production cost is moderate, and the volume of the optical agglomerate is extremely accurate.

The use of a spherical or rounded preform in a molding unit having a convex upper surface on the lower mold results in several problems. This rounded, optical material usually rolls off the raised central convex area 22a and against the barrel 23. FIG. 1 represents this type of mold charging. The optical material resting on one side of the lower mold makes it difficult to form a uniform and accurate optical lens element or other finished product. The distribution of pressure across the mold width is not uniform. One portion of the optical material must be laterally forced across the entire width of the mold while another portion is only vertically pressed. Because of this, it is necessary to accurately cut the molded optical component and polish it to prepare a precision product. Even then, residual internal stresses persist.

Figure 3:
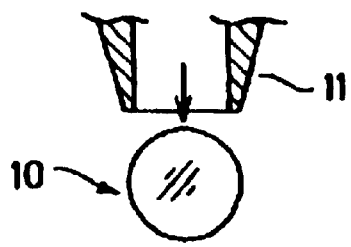
FIG. 3 depicts a viscous optical material agglomerate dropping from a nozzle.
Figure 4:
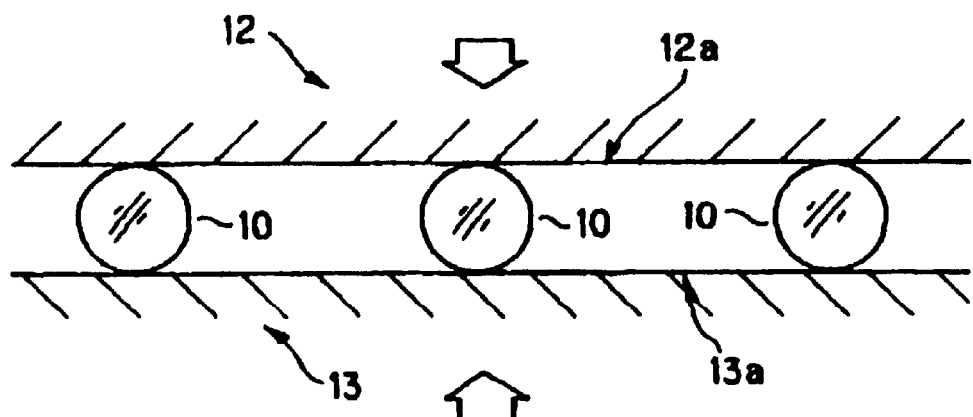
FIG. 4 depicts viscous optical material agglomerates positioned between pressing surfaces.
Figure 5:
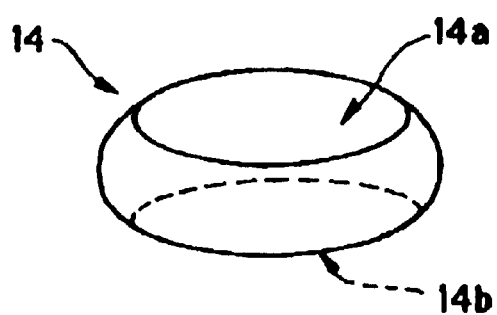
FIG. 5 depicts a pressed disc-shaped optical preform.

FIGS. 3–5 demonstrate the procedure used to form a preform for molding the optical component of the invention.

In order to overcome the above-mentioned problems: (a) the optical materials for molding the optical components of this invention are selected; (b) the final optical product volume is calculated, measured or otherwise determined. This volume is the actual volume of the optical component after it is pressure molded into its final shape; (c) the optical materials in a viscous state are dropped from a specific nozzle 11 aperture with the dropped amount of the material measured to be identical to the optical component volume being formed, as determined in (b); (d) the dropped optical material forms an optical agglomerate 10 in the shape of a drop, or a rough sphere or globe; (e) the dropped optical materials are compressed between a first surface 12a and a second surface 13a to shape an optical preform 14. Compressing the dropped optical materials between two pressure members or surfaces results in an optical preform 14 that has a rough disc shape with flat upper 14a and flat lower 14b surfaces; (f) the optical preform 14 is placed in a molding unit 20 and shaped into the final optical component form between the mold surfaces of the molding unit.

After choosing the optical material, the final optical component volume is determined. The optical material dispensing apparatus (not shown) is adjusted so as to dispense a volume identical to the calculated component volume.

As to the optical material formation, it is necessary to properly control the temperature of the optical material, the viscosity of the optical material, the form of the nozzle 11, the diameter of the nozzle, and the separation method. By controlling these variables, a precise amount of the optical material is dropped, and the volume is maintained to be extremely accurate. A roughly spherical agglomerate of optical material 10 is produced as indicated in FIG. 3. It is produced by dropping the optical material, heated to the viscous condition, from the nozzle 11. The nozzle is used in combination with a measuring means (not shown). The dropped optical materials are cooled by falling through air, where they take a roughly spherical shape.

FIG. 4 demonstrates a multiple number of roughly spherically-shaped, optical agglomerates 10 placed between an upper pressing member 12 and the lower pressing member 13. The face 12a of the upper pressing member is opposed to the face 13a of the lower pressing, member. Both the upper face 12a and the lower face 13a are shown as flat surfaces. After raising the temperature of the optical materials above the transition point, the optical materials are further heated. This heating intenerates the agglomerate causing it to have a plastic consistency. In this position and condition, the air pressure mechanism (not shown) moves the upper compression member 12 down and the optical agglomerate is pressed. As indicated in FIG. 5, the optical agglomerate 10 is pressed into a rough, disc-shaped optical preform 14. The pressed optical preform 14 has a flat upper face 14a and a flat lower face 14b with a diameter pressed to be slightly less than that of the molding unit it is to be molded in. After the disc shaped preform 14 is shaped, it is gradually cooled, and the air pressure mechanism (not shown) raises the upper pressing member 12, and the optical preform 14 is removed. This optical preform 14 is a rather rough, flat-shaped disc pressed out similar to the optical disc 40 shown in FIG. 2. It can then be molded into optical components, such as a biconcave lens element. The optical preform 14, having flat top and bottom surfaces can be stably placed on a lower mold having an upper convex surface, as indicated in FIG. 2, without slipping or shifting.

The optical material agglomerate 10 is formed by a very accurate drop from the nozzle 11. This results in the volume of the optical agglomerate, the optical preform 14, and the optical component being very accurate. Because of this, the final optical component, after being molded, is extremely accurate and can be used without the grinding and polishing operation being performed.

Using the nozzle drop delivery to form the optical agglomerate 10 and pressing the optical agglomerate to form the rough, disc-shaped optical preform 14, by pressing with the flat surfaces 12a, 13a, results in a moderate over-all production cost compared to the traditional grinding process.

The molds shown in FIGS. 1 and 2 have a convex surface on both the upper and lower molds. These molds will produce a biconcave lens element. This invention is not limited to this configuration. The optical preform may be molded into other shapes having both sides concave, similar to the biconcave lens element that would be produced by the molding unit 20. A one-sided, concave lens element preform can be made wherein one surface is flat and the opposite surface is concave. Other lens elements, such as one-side, concave lens elements and a meniscus lens elements, or mirrors, are possible manufactured products. Compression molding of the optical preform allows for the production of multiple lens elements at the same time, or individual lens element production.

The invention being thus described, it will be obvious that the same may be varied in many ways. For example, while the vertical molding unit shown in FIGS. 1 and 2 is preferred, the instant process can be performed using other types of molds. For example, a horizontal type mold can be used as well as other pressure forming molding means comprising at least a first and second mold. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. A process of forming an optical element from optical material, said process comprising the following steps:

(a) calculating the volume of said optical element;

(b) heating said optical material so as to be a viscous fluid;

(c) dropping a predetermined volume of the heated optical material from a nozzle to form a nearly spherical mass, said predetermined volume being the precise volume of optical material that is required to form said optical element, said precise volume being identical to the volume calculated in said step (a) above;

(d) pressing said nearly spherical mass between first and second press surfaces to form an optical disc preform, the volume of said spherical mass, the volume of said optical disc preform, and said calculated volume of said optical element being identical; and (e) pressing said optical disc preform using a molding unit having a pair of molds to form said optical element.

2. The process of claim 1, wherein step (e) includes the sub-steps of:

(1) placing said optical disc preform into the molding unit; and (2) pressing said optical disc preform into the shape of a lens element.

3. The process for manufacturing a precision optical component of claim 1, wherein step (d) includes cooling the optical material into a solid state after the optical material is formed into the optical disc preform.

4. The process for manufacturing a precision optical component of claim 1, wherein the molding unit of step (e) provides a relatively vertical, reciprocating motion between an upper mold and a lower mold, with said lower mold having an upper convex surface.

5. The process for manufacturing a precision optical component of claim 1, wherein step (e) includes heating said molding unit to change said optical disc preform into a plastic state prior to forming said optical preform into an optical component.

6. The process for manufacturing a precision optical component of claim 1, wherein step (d) includes forming said optical disc preform so as to have a flat upper surface and a flat lower surface.

7. The process for manufacturing a precision optical component of claim 5, wherein step (d) includes forming said optical disc preform with a diameter slightly less than the diameter of said pair of molds.

8. The process for manufacturing a precision optical component of claim 4, wherein step (d) includes cooling said optical disc preform to a solid state, and step (e) includes heating the molding unit to change said optical disc preform into a plastic state.

9. The process for manufacturing a precision optical component of claim 8, and further including (f) cooling said molding unit to change said optical component into a solid state prior to removing said optical component from said molding unit.

10. The process for manufacturing a precision optical component of claim 1, wherein said molding unit has an upper mold and a lower mold, with said lower mold having an upper surface that is convex.

* * * * *

UNITED STATES PATENT AND TRADEMARK OFFICE
CERTIFICATE OF CORRECTION

PATENT NO. : 6,270,699 B1
DATED : August 7, 2001
INVENTOR(S) : Fujita

It is certified that error appears in the above-identified patent and that said Letters Patent is hereby corrected as shown below:

Title page,
Second column, change: "[74] Attorney, Agent, or Firm — Arnold International; Bruce Y. Arnold" to -- [74] Attorney, Agent, or Firm — Arnold International; Clyde I. Coughenour; Bruce Y. Arnold --;

Column 1,
Line 38, change "convex shaped" to -- convex-shaped --;
Line 62, change "disc shaped" to -- disc-shaped --;

Column 2,
Line 41, change "convexly shaped" to -- convex-shaped --;

Column 3,
Line 38, change "cooled, and the" to -- cooled, the --;

Column 4,
Line 38, change "the lower" to -- a lower --;
Line 40, change "pressing, member." to -- pressing member. --;
Line 53, change "disc shaped" to -- disc-shaped --; and, Column 5,
Line 28, change "horizontal type" to -- horizontal-type --.

Signed and Sealed this

Twelfth Day of March, 2002

Attest:

Attesting Officer

JAMES E. ROGAN
Director of the United States Patent and Trademark Office